United States Patent [19]

Kirchberg, Jr. et al.

[11] Patent Number: 5,053,939
[45] Date of Patent: Oct. 1, 1991

[54] CONTROL OF PWM INVERTERS BY PATTERN DEVELOPMENT FROM STORED CONSTANTS RELATING D.C. LINK HARMONICS TO OUTPUT DISTORTION

[75] Inventors: Maurice A. Kirchberg, Jr., Dubuque, Iowa; Alexander Cook, Rockford, Ill.

[73] Assignee: Sundstrand Corporation, Rockford, Ill.

[21] Appl. No.: 573,525

[22] Filed: Aug. 27, 1990

[51] Int. Cl.⁵ .............................................. H02M 1/12
[52] U.S. Cl. .......................................... 363/41; 363/37; 363/95; 363/97; 363/98
[58] Field of Search ........................ 363/41, 95, 98, 37, 363/97

[56] References Cited

U.S. PATENT DOCUMENTS

| | | | |
|---|---|---|---|
| 3,648,150 | 3/1972 | Kernick et al. | 363/41 |
| 4,382,275 | 5/1983 | Glennon | 363/41 |
| 4,480,299 | 10/1984 | Muto et al. | 363/41 |
| 4,527,226 | 7/1985 | Glennon | 363/41 |
| 4,595,976 | 6/1986 | Parro, II | 363/41 |
| 4,626,979 | 12/1986 | JaQuay | 363/41 |
| 4,635,177 | 1/1987 | Shekhawat et al. | 363/41 |
| 4,646,221 | 2/1987 | Sekino et al. | 363/41 |
| 4.757,432 | 7/1988 | Hancock | 363/17 |
| 4.757,434 | 7/1988 | Kawabata et al. | 363/41 |
| 4,800,478 | 1/1989 | Takahashi | 363/41 |
| 4,935,859 | 6/1990 | Kirchberg et al. | 363/39 |
| 4,935,860 | 6/1990 | Kirchberg et al. | 363/39 |
| 4,937,720 | 6/1990 | Kirchberg | 363/41 |
| 4,961,130 | 10/1990 | Kirchberg | 363/41 |

Primary Examiner—Steven L. Stephan
Assistant Examiner—Bruce Dunn
Attorney, Agent, or Firm—Whitham & Marhoefer

[57] ABSTRACT

A pulse-width-modulated inverter in which equations relating switching angles, d.c. link distortion and a.c. inverter output distortion are determined empirically or by computer modeling. The amplitude of a d.c. link harmonic is the equation variable and stored constants particularize the equation for the phase of the harmonic and each switching angle which is to be controlled in response to d.c. distortion. As the d.c. link harmonics change, switching angle modifications are calculated using the stored constants.

2 Claims, 3 Drawing Sheets

CONTROL OF PWM INVERTERS BY PATTERN DEVELOPMENT FROM STORED CONSTANTS RELATING D.C. LINK HARMONICS TO OUTPUT DISTORTION

CROSS REFERENCE TO RELATED APPLICATION

The disclosure of this application is related in subject matter to that of the following U.S. applications. Ser. No. 07/514,674 filed Apr. 25, 1990, by Maurice A. Kirchberg, Jr., et al. for "Suppression of Switching Harmonics"; Ser. No. 07/514,666 filed Apr. 25, 1990, by Maurice A. Kirchberg, Jr., et al. for "Enhanced Real-Time Control of PWM Inverters"; Ser. No. 07/507,489 filed Apr. 11, 1990, by Maurice A. Kirchberg, Jr., for "Real-Time Control of PWM Inverters by Pattern Development From Stored Constants"; Ser. No. 07/521,742 filed May 10, 1990, for "Enhanced Real-Time Control of PWM DC/AC Converter Accounting for Link and Load Variation by Vernier Position of a Single Switching Event", and Ser. No. 07/503,377 filed Apr. 2, 1990, for "PWM Inverter With D.C. Ripple Reduction" which are assigned to the assignee of this application. The disclosures of these applications are incorporated herein by reference.

BACKGROUND OF THE INVENTION

1. Field of the Invention

The present invention generally relates to pulse-width-modulated (PWM) inverters and, more particularly, to an improved real-time method and apparatus for generating modulating patterns which compensate for d.c. link harmonics.

2. Description of the Prior Art

PWM inverters are employed to convert direct current (d.c.) to alternating current (a.c.). In many applications, it is important to carefully regulate the quality of the a.c. generated by the inverter. Accordingly, it is customary to define a point of regulation (POR) downstream of the inverter at which the voltage and current of the a.c. signal generated by the inverter is sampled. The sampled voltage and current would be used to select appropriate PWM switching patterns to minimize distortion at the POR. Based on the voltage and current sensed at the POR, an inverter controller selects or creates in real time an appropriate PWM pattern to ensure the least distortion at the POR. As real and reactive power factors of electrical loads coupled to the inverter change, the PWM patterns fed to the inverter are changed.

A PWM pattern comprises a set of switching transients which, when applied to a d.c. signal via an inverter, produces alternating pulses which, when filtered, approximates a sinusoidal a.c. signal. The pulses in a PWM pattern are of varying width.

Prior inventions have addressed schemes for controlling the harmonic content of the inverter output caused by changes in load parameters. Representative of such inventions is U.S. Pat. No. 4,527,226 to Glennon, which discloses an inverter control system for a PWM inverter circuit. This circuit comprises an angle set look up table and selection logic for addressing the look up table. The angle set defining the inverter output waveform is selected in response to various operating conditions of the inverter. However, considering the number of parameter values and the degree of regulation desired, the number of patterns which must be stored can be prohibitively large.

Additional prior art approaches to pattern generation include the following patents. An earlier patent to Glennon, U.S. Pat. No. 4,382,275, is directed to a PWM inverter having an output signal with reduced harmonic content, wherein a filtered fundamental PWM signal is summed with a controlled signal.

U.S. Pat. No. 4,595,976 to Parro, II discloses an inverter control which is an enhancement of the Glennon inverter control. More specifically, the table look up is implemented as a plurality of memories, one for each phase, each of which is subdivided into a plurality of memory blocks which store a number of bytes. Memory address decoding logic addresses a particular memory block in each memory in accordance with a control signal representing the desired waveform to be generated at each phase output. Thus, the Parro, II inverter control accomplishes individual phase regulation of the inverter output.

U.S. Pat. No. 4,635,177 to Shekhawat et al., discloses a further refinement of the basic Glennon inverter control system. More specifically, the Shekhawat et al., control permits on-line generation of PWM patterns for a neutral point clamped PWM inverter. A microprocessor and memory are coupled to the generating circuitry for calculating switching points for the inverter switches during operation of the inverter. Timer modules are coupled to the microprocessor for developing switch points so that the switches are operated to reduce the distortion of the inverter output signal.

U.S. Pat. No. 4,480,299 to Muto et al., also discloses a microprocessor controller inverter control. However, the Muto et al., PWM inverter is controlled by the use of the fundamental wave voltage of the inverter output as a feedback quantity. Muto et al. fail to show any apparatus for directly dealing with the physical limitations within the inverter itself.

Other patents related to the art of inverters include U.S. Pat. Nos. 3,648,150 to Kerick et al., and 4,626,979 to JaQuay. The Kerick et al., patent discloses an apparatus for comparing a filtered output of a PWM inverter with a reference waveform and generating output voltage signal to control the inverter drive circuit to produce an output waveform substantially duplicating the reference waveform. The JaQuay patent is similar to the Kerick et al. patent in that it is directed to a PWM inverter, including a comparitor for comparing an output voltage with the sum of a reference voltage and a maximum allowable ripple voltage.

Also representative of the prior art are U.S. Pat. Nos. 4,646,221 to Sekino et al., 4,757,434 to Kawabata et al., 4,800,478 to Takahashi, and 4,757,432 to Hancock. The patent to Sekino et al., is directed to a controlling circuit which monitors the output waveform of the inverter and controls the firing of the switch elements in the inverter to restore it to a sinusoidal waveform in the event that it is distorted by nonlinear loads. The patent to Kawabata et al., is directed to a control circuit for a current control minor loop which monitors the instantaneous value of the output current of the power conversion apparatus and adjusts it to the current reference value. The patent to Takahashi is directed to a control for an inverter, wherein an evaluation function on the whole combination of the inverter and the load connected to the a.c. side of the inverter is minimized. The patent to Hancock is directed to a device for time integrating the difference between the electrical output and the reference by varying the switching frequency in the inverters so as to null the difference in a feedback control loop.

The aforementioned co-pending application Ser. No. 07/507,489 discloses a system in which switching angles are calculated from an equation which describes the position of the switching angle for minimum output harmonic distortion as a function of a POR parameter or parameters.

SUMMARY OF THE INVENTION

An object of the invention is the provision of a controller for a pulse-width-modulated inverter which alters the modulating switching pattern to reduce output harmonic distortion caused by distortion on the d.c. link. A controller which can modify switching patterns in real-time from stored parameters.

Briefly, this invention contemplates the provision of a pulse-width-modulated inverter in which equations relating switching angles, d.c. link distortion and a.c. inverter output distortion are determined empirically or by computer modeling. The amplitude of a d.c. link harmonic is the equation variable and stored constants particularize the equation for the phase of the harmonic and each switching angle which is to be controlled in response to d.c. distortion. As the d.c. link harmonics change, switching angle modifications are calculated using the stored constants. This realtime angle set modification technique can be used in combination with the real-time set determination of the co-pending applications previously mentioned, or with prior art set selection techniques.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
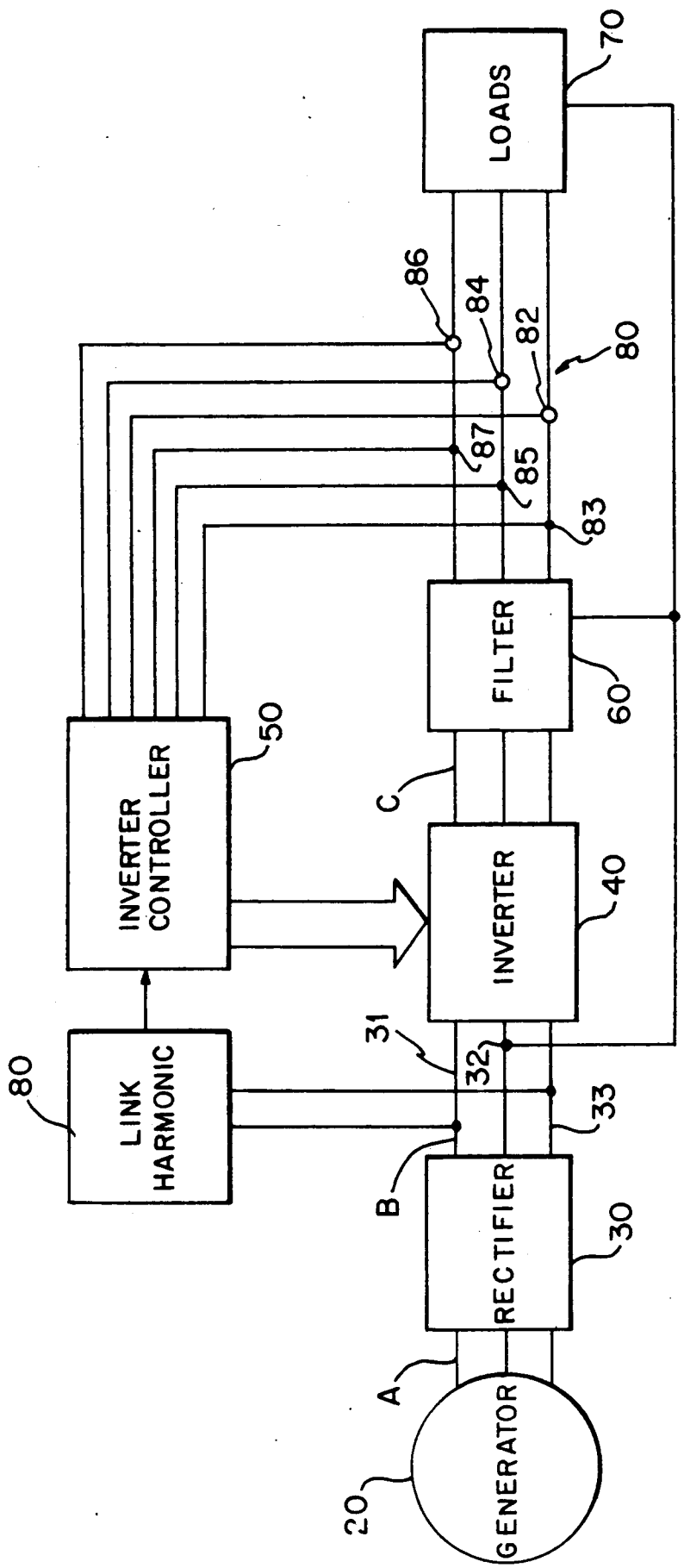
FIG. 1 is a block diagram of a variable speed constant frequency system embodying the invention.

Referring now to the drawings, and more particularly to FIG. 1, there is shown a block diagram of the variable speed constant frequency (VSCF) system embodying the present invention. A generator 20 is mechanically coupled to a variable speed prime mover (not shown) which may be, for example, an aircraft engine. The generator 20 produces power of a frequency which varies as a function of the speed of the prime mover. The resulting a.c. power produced by the generator 20 is therefore termed "wild frequency" a.c. power and is unsuitable for use by aircraft electrical systems or loads, which is the preferred environment for the operation of the VSCF system.

Accordingly, the VSCF system is designed to convert the "wild frequency" a.c. power produced by the generator 20 into constant frequency a.c. power, typically at a frequency in the range of 400 Hz, for use by aircraft electrical systems. "Wild frequency" a.c. power produced by the generator 20 is fed to a rectifier 30 which rectifies the a.c. power into positive and negative d.c. voltages. The d.c. voltages are produced on a d.c. link having a positive d.c. rail 31 and a negative d.c. rail 33. An inverter 40, under control of an inverter controller 50 produces, by pulse width modulation in the preferred embodiment, a PWM waveform from the d.c. voltages which is fed to the filter 60. The filter 60 smooths the PWM waveform produced by the inverter 40 into an approximation of a sinusoidal constant frequency a.c. output which is fed to the aircraft electrical loads 70.

In the specific embodiment of the invention, the wild a.c. power output by the generator 20 is three-phase a.c. power. The constant frequency a.c. power generated by the inverter 40 and smoothed by the filter 60 is likewise three-phase. In the preferred embodiment of the invention, the inverter is provided with a neutral point via lead 32 coupled to an output phase of the filter 60 and the rectifier 30.

Figure 2:
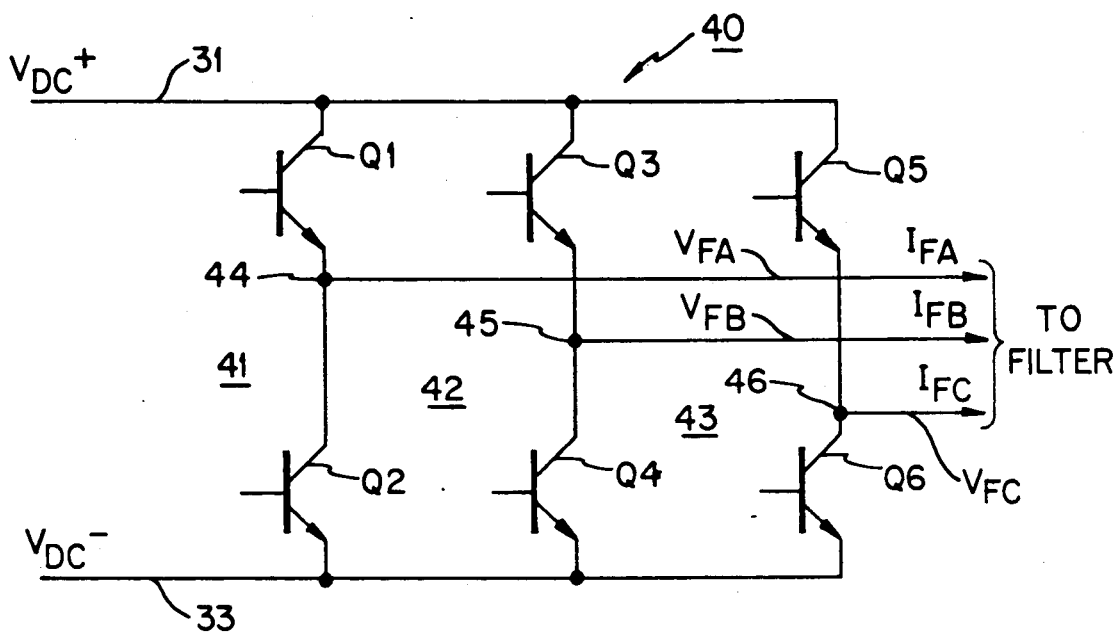
FIG. 2 is a simplified block and schematic diagram of a typical three-phase inverter.

Referring to FIG. 2, the inverter 40 includes three inverter legs 41, 42 and 43, each comprising two controllable power switches, such as switches $Q_1$ and $Q_2$, which are connected in series across the positive and negative d.c. rails 31 and 33. Referring specifically to the inverter leg 41 as an example, the switches $Q_1$ and $Q_2$ are operated in accordance with a PWM waveform pattern developed by the inverter controller 50. Likewise, phase outputs $V_{FB}$, $I_{FB}$ and $V_{FC}$, $I_{FC}$ are produced at the junctions 45 and 46, respectively, by operation of the switches $Q_3$, $Q_4$ and $Q_5$, $Q_6$ in the inverter legs 42 and 43.

Referring back to FIG. 1, the inverter controller 50 responds to signals sensed from a point of regulation (POR), indicated generally as 80, which is located downstream of the filter 60. Current is sensed by current transformers 82, 84 and 86 which sense each of the three phase currents produced by the filter 60, respectively. Likewise, voltages are sensed by taps 83, 85 and 87 applied to each of the three phases produced by the filter 60. Each of the signals appearing at the current transformers 83, 84 and 86, and taps 83, 85 and 87, is fed to the inverter controller 50 and is used to select or generate an appropriate PWM switching pattern. Depending on the real or reactive components of the power requirements of the loads 70, the inverter controller 50 selects from memory or creates in real time a PWM pattern which, when applied to the inverter 40 and filtered by the 60, produces an approximate sinusoidal a.c. output waveform which is optimized to have the least distortion at the POR 80.

The PWM switching pattern produced by the inverter controller 50 is a collection of switching angles, or times, which is used to operate individual transistor switches of the inverter 40. Accordingly, when one knows the current and voltage of the POR 80, one can then determine the nature of the loads 70 (e.g., real and reactive power components and balance of the loads), and can select, or generate, a suitable pattern to control the inverter 40 to minimize distortion at the POR 80. This selection of a basic switching pattern established in part to compensate for load induced errors in the output may use suitable prior art techniques such as those disclosed in the aforementioned Glennon U.S. Pat. No. 4,527,226 patent or in the above referenced co-pending applications.

Figure 3:
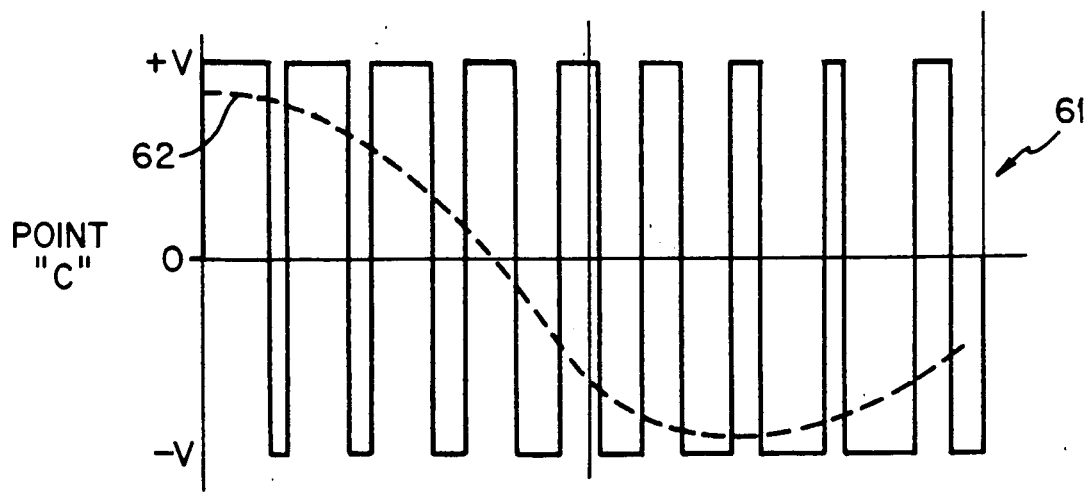
FIG. 3 is a graph representing a controlled inverter output pattern signal taken at point "C" of FIG. 1.

FIG. 3 represents an idealized example of an inverter output signal indicated generally as 61 and taken at point "C" in FIG. 1. The signal 61 comprises a plurality of positive and negative pulses of varying widths. The pulses produce an a.c. waveform when filtered. That waveform is approximately sinusoidal as represented by dotted line 62 corresponding to signal 61. During operation, the VSCF system must supply power to loads having different real and reactive power requirements. Accordingly, the inverter controller 50 of FIG. 1 must store, or generate in real time, PWM patterns which are optimized to provide minimum harmonic distortion to the POR 80 for particular operating conditions; i.e., particular real or reactive power loads. The different real and reactive power components of the loads are sensed at the POR 80 as shown in FIG. 1. In response to signals sensed at the POR 80, the inverter controller 50 provides an inverter control output signal which is used to control switches within the inverter 40.

Distortion on the d.c. link can cause distortion in the inverter a.c. output for a given switching set. In accordance with the teachings of this invention, a link harmonic analyzer 90 determines the amplitude and phase of the d.c. link distortion for certain selected harmonics of interest of the a.c. output fundamental. As will be described in more detail in connection with FIGS. 4 and 5, parameters stored in the controller 50 correlate the harmonic content of d.c. link distortion with switching angle positions to reduce the distortion in the a.c. output of the inverter.

The phase and magnitude of the harmonics of interest on the d.c. link are preferably determined in real-time by the analyzer 90, preferably within the period of one cycle of the output fundamental. The analyzer 80 may comprise a microprocessor programmed to analyze the harmonic content of the d.c. link by means of a Fast Fourier Transform algorithm, or in an analogue fashion such as disclosed in U.S. Pat. Nos. 3,745,317 and 3,883,792.

Figure 4:
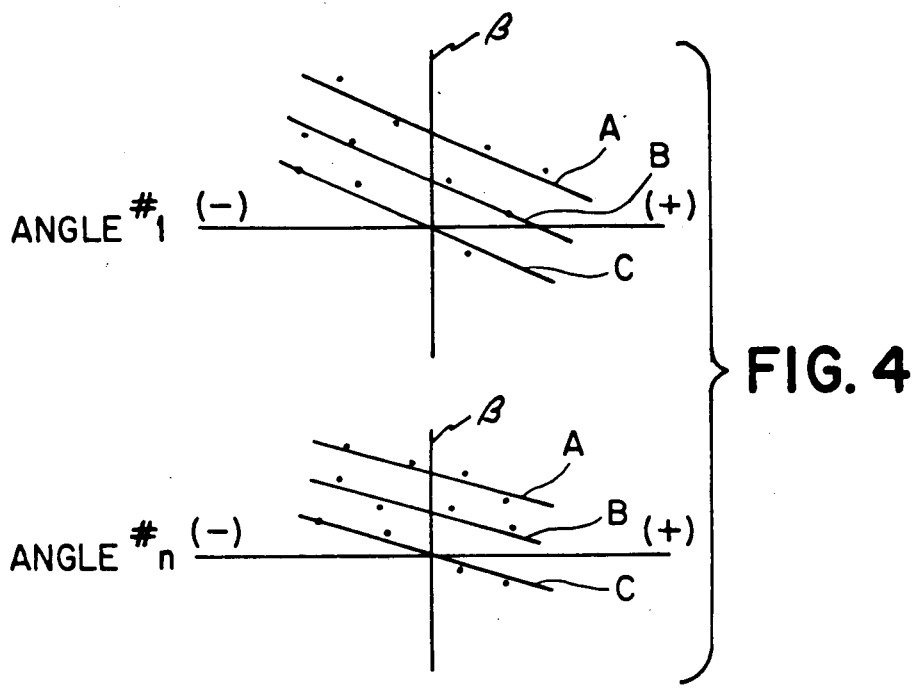
FIG. 4 illustrates plots (empirically or computer model derived) of switching angle position correction versus d.c. link harmonics of interest.

Referring now to FIG. 4, equations for determining magnitude and direction of a vernier change in switching angle location to correct for d.c. link distortion may be derived empirically for the operation of a system or class of systems such as shown in FIG. 1 by either testing an actual system or by means of a computer model of the system. The example of FIG. 4 considers a single harmonic (e.g., the third harmonic) for ease of explanation. It will be appreciated that equations may be developed in a similar manner for additional d.c. link harmonics. In many systems, one or two switching angles will be particularly sensitive to a particular d.c. link harmonic so that a change in the position of a single angle or two angles will satisfactorily reduce a.c. output distortion resulting from this component of the d.c. link distortion.

In developing a set of equations, the distortion on the d.c. link is varied within a range expected in actual operation. The amplitude and phase of the harmonic of interest on the link is measured at discrete points. At each point the position of one or more switching angles is adjusted to reduce the a.c. output distortion to a minimum for the particular link distortion. As illustrated n FIG. 4, to develop an equation relating d.c. link harmonic to switching angle position of least a.c. output distortion, the harmonic amplitude may be plotted along the vertical x axis and the switching angle position plotted along the horizontal y axis. In order to account for the effect of the phase angle of the link distortion harmonic on a.c. output distortion, a series of similar experiments may be made for distortion on the link resulting in different phase relationships between the harmonic and for example the a.c. output fundamental or other suitable phase reference. The result is a family of curves for each switching angle of interest relating d.c. link harmonic and phase for a harmonic of interest with a switching angle to provide minimum a.c. output distortion. Curves may be calculated for one, some or all of the switching angles, depending on the effect the position of the switching angle has on output distortion for the particular harmonic of interest.

It will be appreciated that d.c. link distortion is in most systems a second order factor affecting a.c. output distortion. The basic switching pattern may be selected based on POR conditions using techniques disclosed in the prior art or in the above-referenced co-pending applications. The experimental data may be obtained using a set of nominal switching angle positions selected for a representative POR condition. The experimental data for switching angle position to produce minimum a.c. output distortion may conveniently be plotted in terms of a vernier correction to the nominal switch position. The vernier correction may with satisfactory results be applied to all of the switching patterns used in actual operation.

Using well known techniques, an equation is determined which will fit or approximate a curve passing through the plotted points.

Experience shows that the equation for many systems will be a equation of the form:

$$a_n = K_1 + K_2 \cdot \beta \sin(\theta + K_3)$$

where: $\beta$ is the magnitude of the d.c. link harmonic for a harmonic of interest; $K_1$, $K_2$ and $K_3$ are set constants which are different for each switching angle; $\theta$ is the phase of the harmonic. The constant $K_1$ establishes a nominal position for the angle and hence its order in the sequence. Of course, the equation, depending upon the shape of the curve passing through the points, may be of a higher order. Similarly, it will be appreciated that for most cases it will be satisfactory if the equation approximates the curve.

Figure 5:
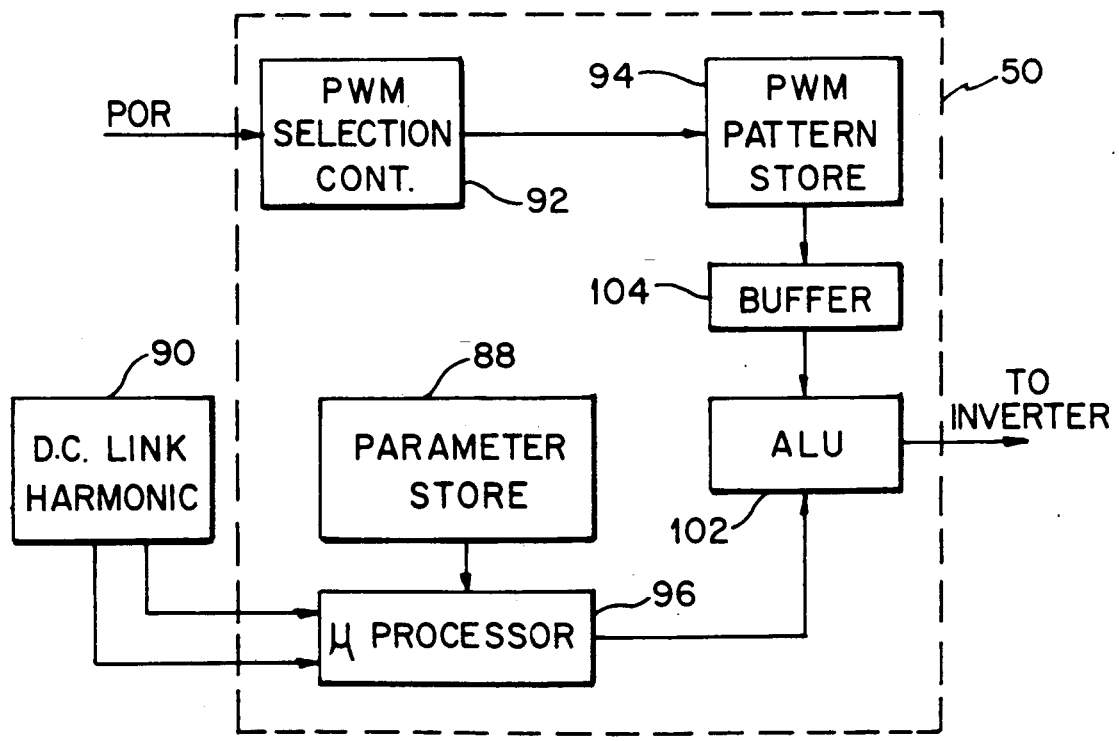
FIG. 5 is a more detailed block diagram of the inverter controller shown in FIG. 1.

Referring now to FIG. 5, in this embodiment of the invention, the controller 50 includes a PWM selection controller 92 which in response to POR parameters selects a pulse-width-modulating pattern from the PWM store 94. It will be appreciated that this initial step in pattern generation is a well known prior art technique.

The d.c. link analyzer 90 has outputs indicative of magnitude and phase relative to the a.c. output fundamental for one or more harmonics of coupled to a microprocessor 96 which has been programmed to solve an equation determined in accordance with the method explained in connection with FIG. 4. Microprocessor 96 fetches from a parameter store 88 the constants (e.g., $K_1$, $K_2$, and $K_3$) for each to angle in sequence to which a vernier correction is to be applied. Using these parameters and the equation, the processor 96 calculates a vernier correction to the switching angle position or positions to reduce output distortion resulting from distortion on the d.c. link.

The output of the microprocessor 96 is a vernier correction to the switching angle position or if corrections are applied to more than one angle, a series of corrections. The correction is coupled to an ALU 102 which applies the correction to the basic angle position stored in a buffer 104. The output of the ALU 102 is coupled to the inverter 40.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A pulse width modulating inverter, comprising in combination:

a pulse width modulating switch having a d.c. link input and a pulse width modulated output;

means for determining one or more harmonic components of said d.c. link input;

means for controlling a switching angle at which said pulse width modulating switch operates to connect or disconnect said d.c. link input with said pulse width modulated output;

said switching angle controlling means including means storing a st of constants, said constants comprising the constant terms of an equation which describes the locus of said switching angle for an inverter output characteristic as a function of said one or more harmonic components of said d.c. link;

means responsive to said determining means for fetching said stored set of constants; and means for calculating said switching angle as a solution to said equation with said stored set of constants and said d.c. link harmonic components comprising terms of said equation.

2. A pulse width modulated inverter as in claim 1 wherein said desired inverter output characteristic is reduced distortion.

* * * * *